July 19, 1966    P. A. LAJOIE    3,261,933
ROTARY POSITIONING APPARATUS
Original Filed Sept. 24, 1962    9 Sheets-Sheet 1
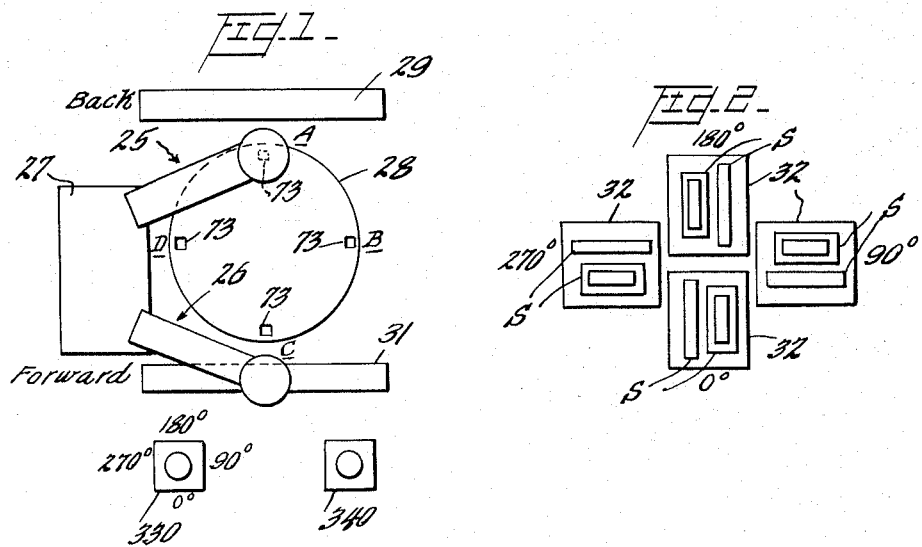
INVENTOR
P. A. Lajoie,
BY R. P. Miller
ATTORNEY

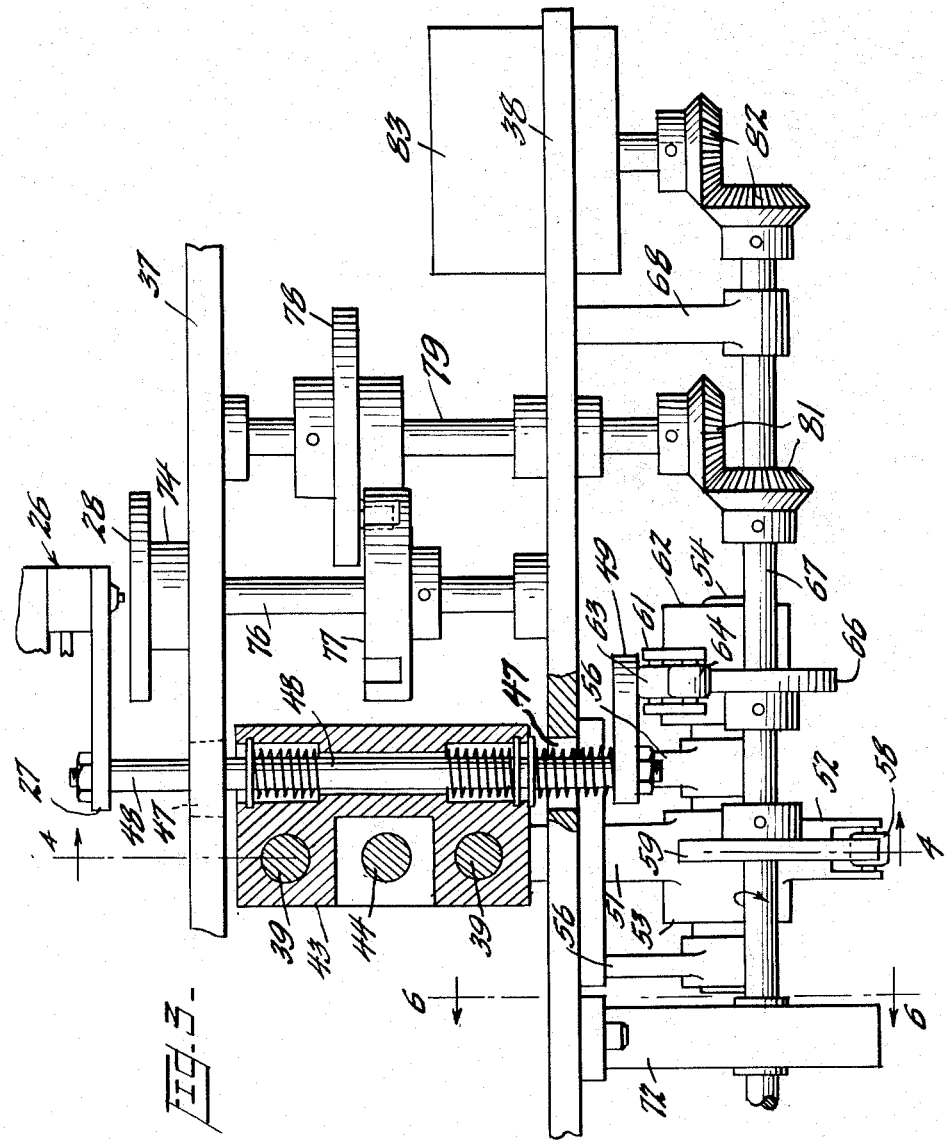

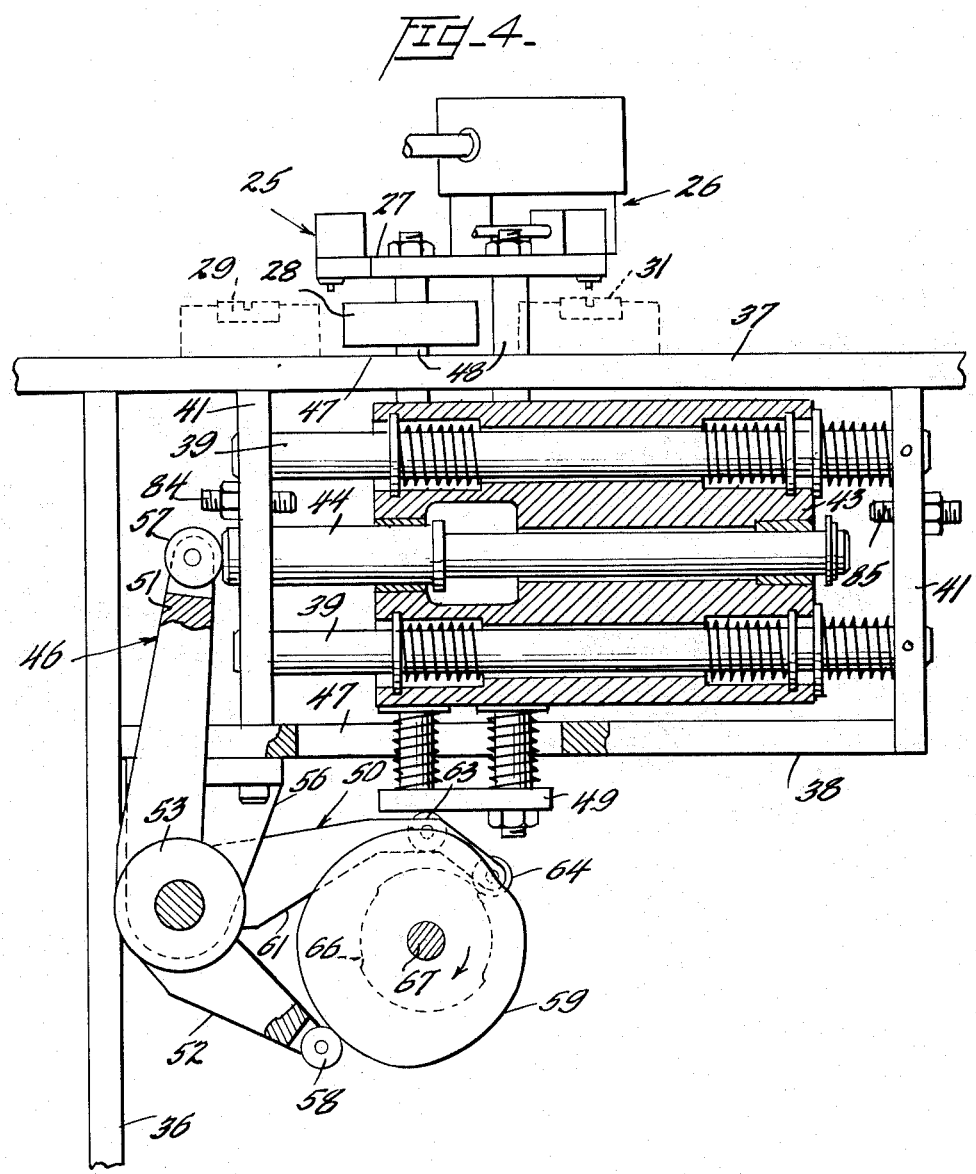

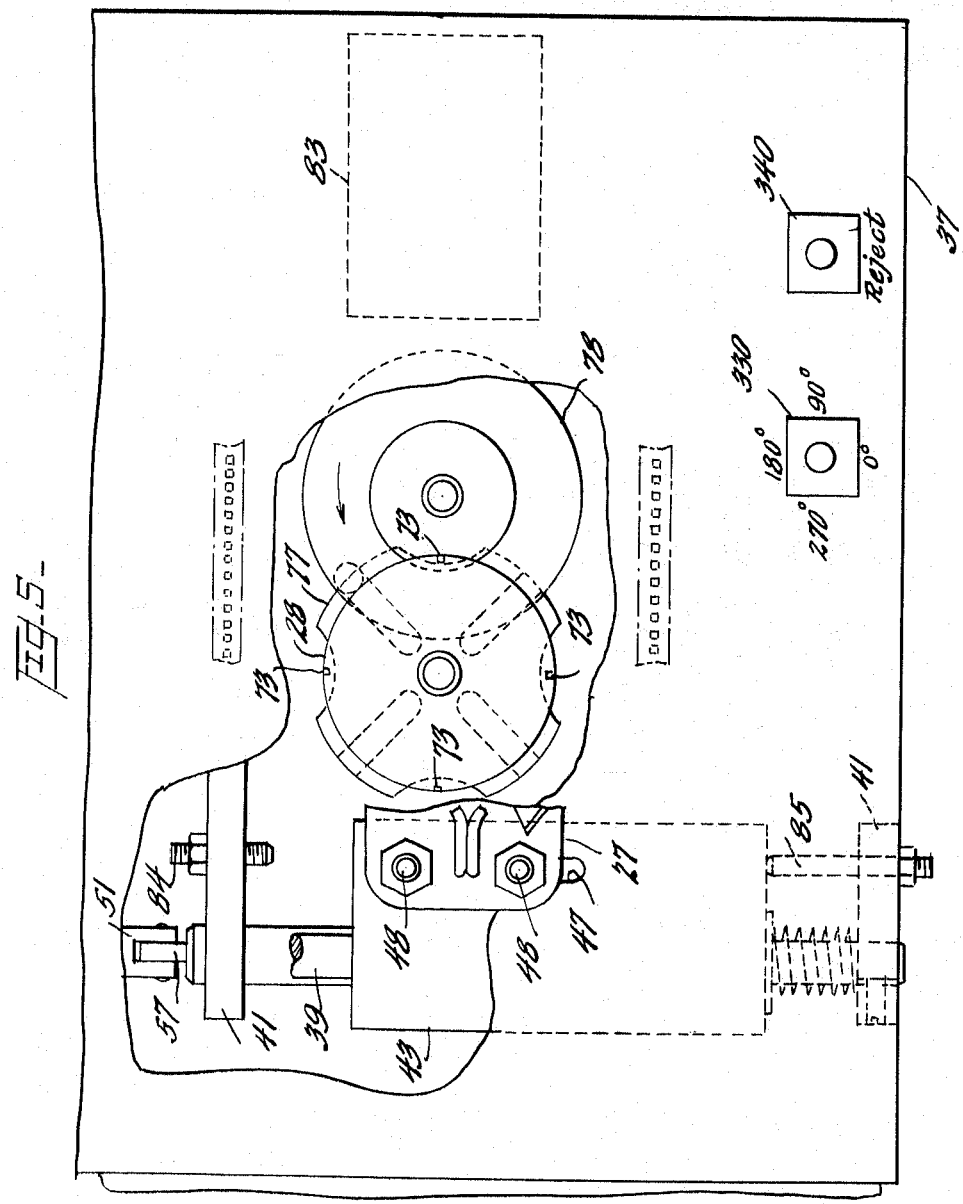

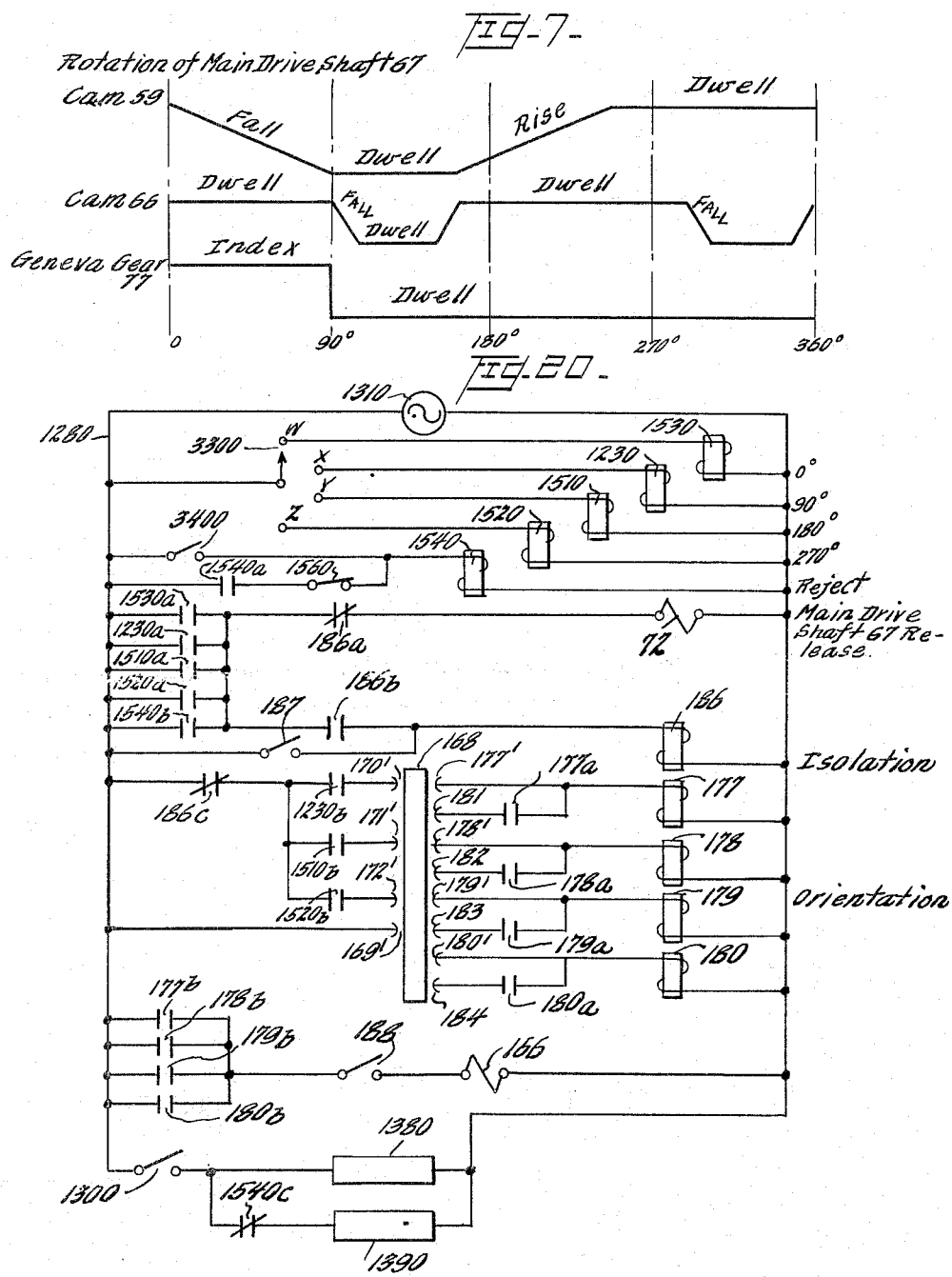

July 19, 1966 P. A. LAJOIE 3,261,933
ROTARY POSITIONING APPARATUS
Original Filed Sept. 24, 1962 9 Sheets-Sheet 6
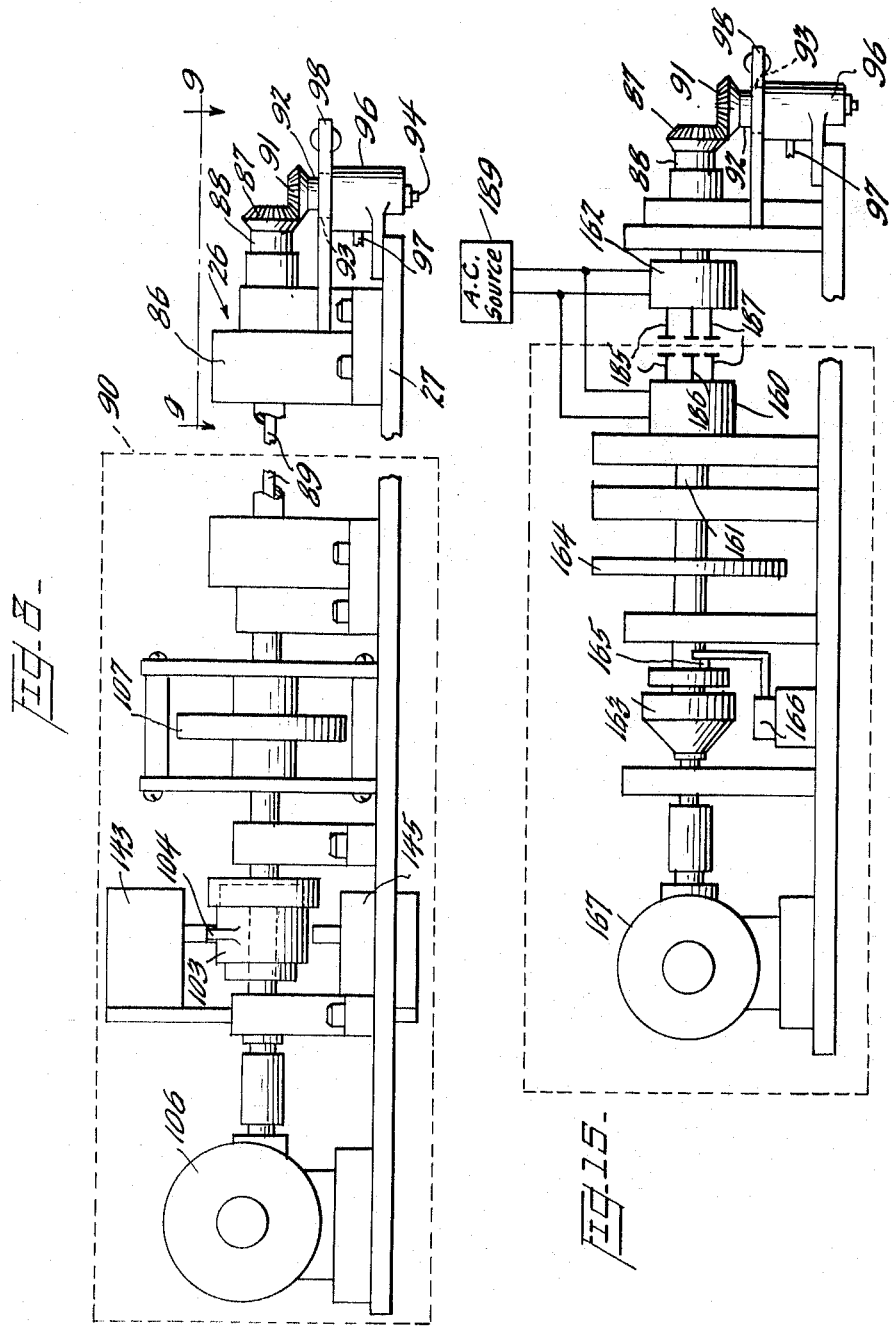

July 19, 1966 P. A. LAJOIE 3,261,933
ROTARY POSITIONING APPARATUS
Original Filed Sept. 24, 1962 9 Sheets-Sheet 7
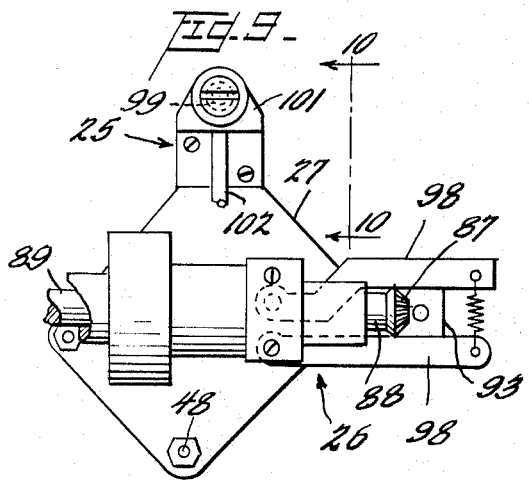
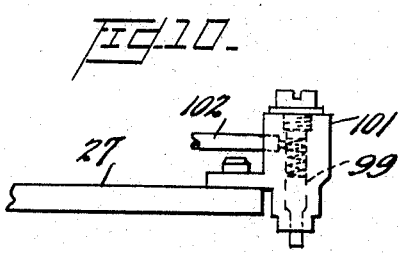
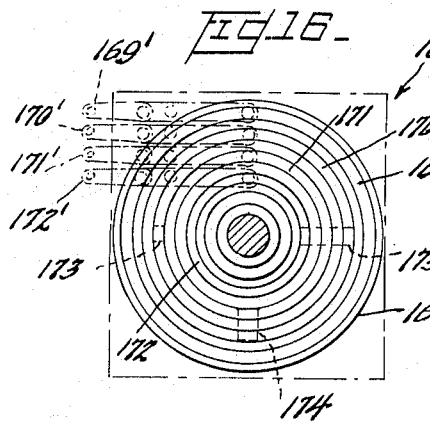

July 19, 1966　　　P. A. LAJOIE　　　3,261,933
ROTARY POSITIONING APPARATUS
Original Filed Sept. 24, 1962　　　9 Sheets-Sheet 8
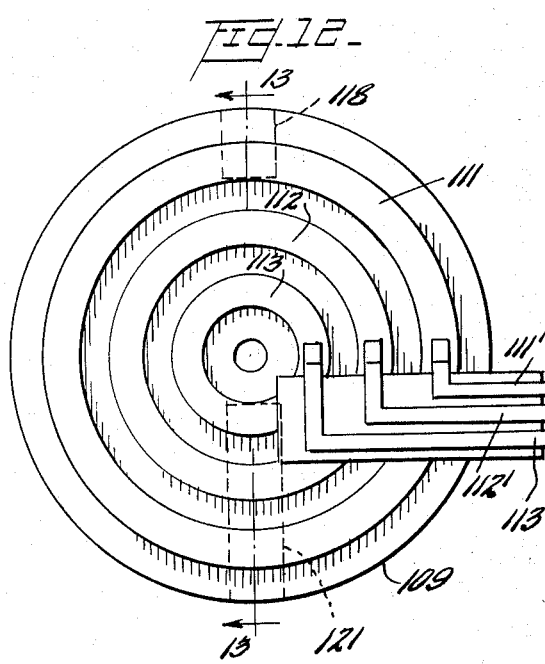
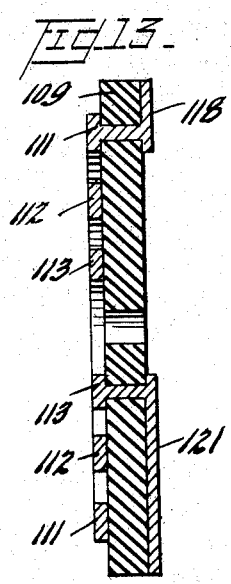
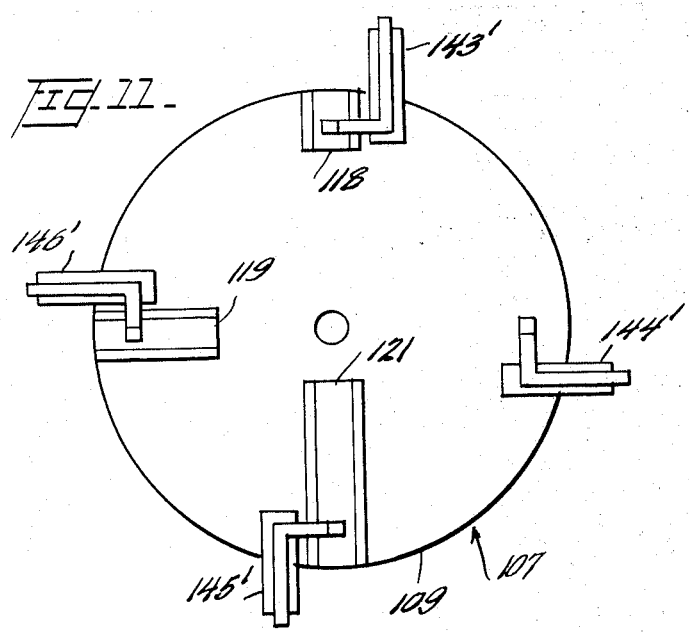

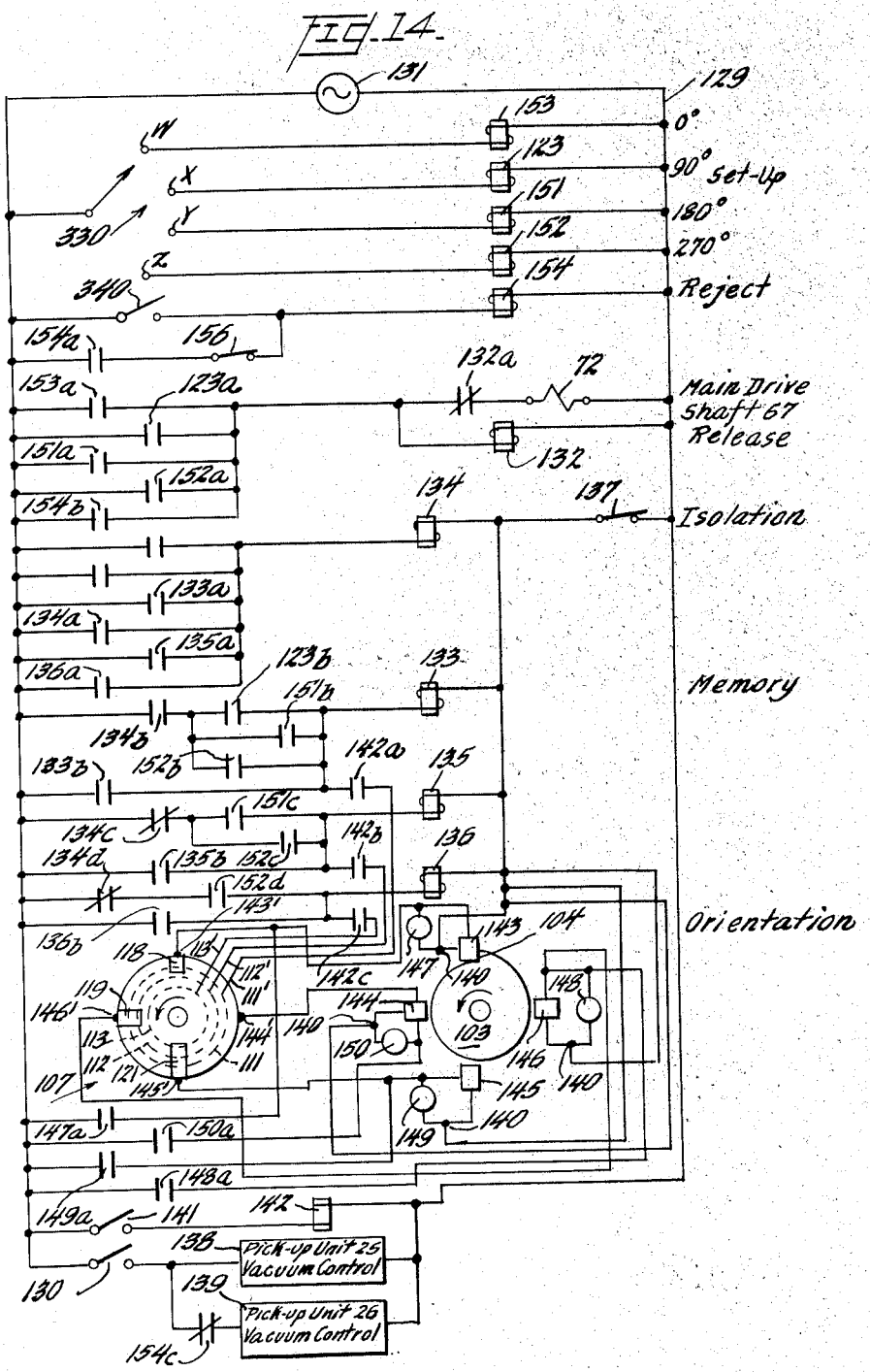

United States Patent Office 3,261,933
Patented July 19, 1966

3,261,933
ROTARY POSITIONING APPARATUS
Peter A. Lajoie, Oley, Pa., assignor to Western Electric Company, Incorporated, New York, N.Y., a corporation of New York
Original application Sept. 24, 1962, Ser. No. 225,792, now Patent No. 3,198,311. Divided and this application May 10, 1965, Ser. No. 464,262
6 Claims. (Cl. 200—18)

This application is a division of application Serial No. 225,792, filed September 24, 1962, now Patent 3,198,311, dated August 3, 1965.

This invention relates to rotary positioning apparatus and more particularly, to rotary positioning apparatus of the indexing type. Accordingly, the general objects of this invention are to provide new and improved apparatus of such character.

It is another object of this invention to provide new and improved rotary positioning apparatus of the type having a "floating" positioning reference, that is, a positioning reference which rotates with the apparatus so that the apparatus need not be reset to a predetermined reference after each rotational index thereof.

With these and other objects in mind, rotary positioning apparatus, illustrating certain features of the invention, may include a first rotatable member and a mechanism for selectively engaging the first rotatable member to prevent rotation thereof and for disengaging the member to allow rotation thereof. The operation of the engaging and disengaging mechanism is controlled, in accordance with a desired rotary position, by a control unit which includes a second rotatable member. The second rotatable member is rotatable with the first for carrying a predetermined positioning reference around with the members as they rotate, and is associated with the engaging and disengaging mechanism such that the operation of this mechanism is a function of the position of the second rotatable member.

The invention will be more readily understood from the detailed description which follows when read in conjunction with the drawings wherein:

FIG. 1 is a diagrammatic view of apparatus for transferring and orienting semiconductor wafers, the apparatus including an orienting unit embodying certain principles of the invention;

FIG. 2 is a view illustrating the four positions which a semiconductor wafer may occupy at station B in FIG. 1;

FIG. 3 is a fragmentary, front elevational view of the apparatus shown diagrammatically in FIG. 1 with portions removed and broken away for the sake of clarity;

FIG. 4 is a fragmentary view taken along the line 4—4 of FIG. 3 with portions removed and broken away for the sake of clarity;

FIG. 5 is a fragmentary plan view of the apparatus of FIG. 3 with portions removed and broken away for the sake of clarity;

FIG. 6 is a fragmentary view taken along the line 6—6 of FIG. 3 with portions removed and broken away for the sake of clarity;

FIG. 7 is a schematic view illustrating a cycle of movement of the cams and Geneva gear utilized in the invention;

FIG. 8 is a view with portions removed and broken away for the sake of clarity illustrating an orienting unit embodying certain principles of the invention with a pickup unit;

FIG. 9 is a fragmentary view taken along the line 9—9 of FIG. 8 with portions removed for the sake of clarity;

FIG. 10 is a fragmentary view taken along the line 10—10 of FIG. 9;

FIG. 11 is a view illustrating one side of a rotary control switch employed in the orientation unit of FIG. 8;

FIG. 12 is a view illustrating the other side of the rotary control switch shown in FIG. 11;

FIG. 13 is a view taken along the line 13—13 of FIG. 12;

FIG. 14 is a schematic view illustrating a relay control circuit employing the orientation unit of FIG. 8;

FIG. 15 is a view of a alternative embodiment of the orienting and pickup unit of FIG. 8;

FIG. 16 is a view of one side of a rotary control switch utilized in the embodiment shown in FIG. 15;

FIG. 17 is a view of the other side of the rotary control switch shown in FIG. 16;

FIG. 18 is a view taken along the line 18—18 of FIG. 17;

FIG. 19 is a view taken along the line 19—19 of FIG. 17; and

FIG. 20 is a schematic view illustrating a relay control circuit employing the orientation unit of FIG. 15.

The invention will be described in connection with its use in an apparatus for transferring and orienting semiconductor wafers.

*General arrangement*

Generally, as seen in FIG. 1, the apparatus includes a stationary vacuum pickup unit, designated generally by the numeral 25, and a rotary vacuum pickup unit, designated generally by the numeral 26, each unit being mounted on a plate 27 disposed for vertical and horizontal movement with respect to a rotary table 28 and to two trays 29 and 31 located adjacent the table. The tray 29 which is located at what will be hereinafter referred to as the back position of the apparatus is adapted to receive semiconductor wafers to be oriented, and the tray 31 which is located at what will hereinafter be referred to as the forward position of the apparatus is adapted to receive oriented semiconductor wafers. Four stations designated generally by the letters A, B, C and D, are disposed around the table at 90° intervals. The functions performed at the stations A, B, C and D are as follows: at station A, an unoriented wafer from the tray 29 is loaded onto the table 28; at station B, a wafer is inspected; at station C, a wafer is removed from the table, oriented and deposited into the tray 31; and at station D, a defective wafer is ejected into a reject receptacle (not shown).

In operation, assuming an acceptable wafer is located on the table at station B, the wafer is inspected thereat by an operator with the aid of an optical instrument such as a comparator (not shown) to determine the position thereof. As seen in FIG. 2, a wafer 32 at station B can occupy any one of four positions according to the orientation of its contact stripes S, only one of which is correct. For purposes of explanation let it be assumed that the position labeled as 0° is the correct one. Accordingly, if a wafer is in any of the other three positions it must be rotated by the amount set out next to these positions to orient it to the correct position, viz, 0°. For example, a wafer located at the 180° position will be rotated 180° to the 0° position. Upon ascertaining the position of the wafer, the operator throws a four position spring biased set-up switch 330 (FIG. 1) to the position which corresponds to the amount of rotation required to orient the wafer. Upon actuation of the set-up switch 330 the plate 27 moves to the back position. This places the pickup unit 25 over the tray 29 and the pickup unit 26 over station C of the rotary table 28. Simultaneously, therewith, the table 28 indexes 90° thereby transporting the wafer at station B to station C. The plate 27 then moves downward to place the pickup units 25 and 26 over a wafer in the tray 29 and the wafer at station C respectively. In this position, the respective vacuums of the pickup units 25 and 26 are actuated to cause adherence of their respective wafers thereto. The plate 27 is then moved upwards. After the plate 27 has reached its up position, it is actuated for movement to the forward position. During the movement of the plate 27 from the back to the forward position, the rotary pickup unit 26 is rotated to orient the wafer adhering thereto to the 0° position. At the forward position, the plate 27 moves downward and the respective vacuums of the pickup units 25 and 26 are deactuated. This releases and places the unoriented wafer carried by the pickup unit 25 on the table 28 at station A and the now oriented wafer carried by the pickup unit 26 in the receiving tray 31.

In the event the wafer at station B is defective, a reject switch 340 is actuated. Upon actuation of the switch 340, the apparatus will proceed through the foregoing sequence or cycle of operations with the exception that the vacuum to the rotary pickup unit 26 will not be actuated. Accordingly, the wafer transported to station C upon the indexing of table 28 will not be picked up. Instead, upon the next succeeding indexing of table 28, it will proceed to station D where it will be ejected into a reject receptacle (not shown).

*Detailed arrangement*

In more detail, referring to FIGS. 3, 4 and 5, it is seen that the apparatus includes a supporting member 36 having a top plate 37 and a bottom plate 38 connected thereto. Two spring biased rods 39—39, fixedly connected to a pair of members 41—41 connected to the top and bottom plates 37 and 38, slidably support a rectangularly shaped carriage 43. A third spring biased rod 44, intermediate the rods 39—39, is slidably supported in one of the members 41—41 and is in driving engagement with the carriage 43. Two spring biased posts 48—48 slidably disposed for vertical movement in the carriage 43, extend therethrough and through a pair of elongated slots 47—47 located in the top and bottom plates 37 and 38, respectively. At their tops, the posts 48—48 fixedly carry the supporting plate 27 for the pickup units 25 and 26 and at their bottoms, they support a cam follower engagement plate 49.

As seen in FIG. 4, movement is imparted to intermediate slide rod 44 by a cam follower designated generally by the numeral 46, which includes a pair of arms 51 and 52 radially extending from a hub 53 rotatably mounted on a shaft 54 which is fixedly supported by a pair of brackets 56—56 depending from the bottom plate 38. The arms 41 and 52 are provided with rollers 57 and 58, respectively, mounted rotatably at the free ends thereof. The roller 58 of arm 52 travels about the periphery of a cam 59 and translates the axial deviation of the cam into a rocking motion of the follower 46. The rocking motion of the follower 46, in turn, is transmitted to the intermediate slide rod 44, by means of the roller 57, to cause linear reciprocal movement thereof and of the carriage 43. Vertical movement is imparted to posts 48—48 by a cam follower designated by the numeral 50 which includes a substantially elongated arm 61 radially extending from a hub 62 rotatably mounted on the shaft 54. The arm 61 has two rollers 63 and 64 mounted thereon, the roller 63 being designed for travel along plate 49 and the roller 64 being designed for travel about the periphery of a cam 66.

The cams 59 and 66 are mounted on a main drive shaft 67 and rotate therewith as the shaft 67 is rotated by a suitable mechanism, such as a motor (not shown). The main drive shaft 67, which is rotatably supported by a pair of brackets 68—68 (FIG. 6) depending from the bottom plate 38, has a third cam 69 fixedly mounted thereon for engagement with a movable member 71 of a solenoid 72 to provide single revolution operation of the main drive shaft 67 (FIG. 6). This is accomplished by energizing the solenoid 72 to cause its movable member 71 to retract and disengage cam 69, thereby releasing the shaft 67 for rotation. After a small rotation of the shaft 67, e.g., a rotation sufficient to carry a raised peripheral portion 70 of the cam 69 past the line of action of movable member 71, the solenoid 72 is de-energized. Accordingly, after one complete revolution of the shaft 67, the movable member 71 re-engages the cam 69 to arrest the motion of the shaft 67.

The rotary table 28 (FIGS. 3 and 5) which has four nests 73—73 therein for receiving semiconductor wafers, is rotatable about a hub 74. Periodic rotation is imparted to the table 28 by a connecting shaft 76 attached to a Geneva gear 77. Geneva gear 77 obtains its motion from a cooperating Geneva drive member 78 mounted on a shaft 79 which is driven through a pair of bevel gears 81—81 by the main drive shaft 67. For each revolution of the main drive shaft 67, the table 28 will index 90°. Also driven by the main drive shaft 67, through a second pair of bevel gears 82—82, is a conventional cam programmer 83. As will be seen in more detail hereinbelow, the purpose of the programmer 83 is to send timing signals to a relay control circuit to aid in sequencing the transfer and orienting operations.

The motion which ensues upon the rotation of main drive shaft 67 will now be described. The apparatus as shown in FIGS. 1, 3, 4 and 5 is in its zero or rest position, that is, it is in readiness to begin a transfer and orienting operation. During the first 90° of rotation of the shaft 67 in a clockwise direction (as viewed in FIG. 4), the Geneva drive gear 78 engages the Geneva gear 77 and causes a 90° rotation thereof, thereby causing the table 28 to index 90°. Concurrently, the axial deviation of the cam 59, during this time causes cam follower 46 to rotate about shaft 54 in a counterclockwise direction, thus causing backward movement of the carriage 43 and of the posts 48—48 through slots 47—47. The carriage 43 moves backwards until it engages an adjustable stop member 84. There is no axial deviation of the cam 66 during this period and consequently no vertical movement of the posts 48—48, the pickup units 25 and 26 thus remaining in their up position as shown (FIGS. 3 and 4). During the next 90° of rotation of the shaft 67, there is no axial deviation of cam 59 and the carriage 43 remains in the back position; however, the axial deviation of the cam 66 during this interval causes the pickup units 25 and 26 to descend, dwell, and rise again to the up position, their respective vacuums being energized during the dwell to cause a wafer from the tray 29 to adhere to the pickup unit 25 and the wafer indexed at the start of the cycle from station B to station C to adhere to the pickup unit 26. During the next 90° of rotation of the shaft 67, the cam 66 has no axial deviation and the pickup units 25 and 26 carrying their respective wafers remain in their up position as the axial deviation of the cam 59 causes the carriage 43 to move to the forward position to place the pickup unit 25 over the table 28 at station A and the pickup unit 26 over the tray 31. The forward position is determined by the engagement of carriage 43 with an adjustable stop member 85. As will be discussed in more detail hereinbelow, an orienting unit designated generally by the numeral 90 (FIG.

8) during this latter interval, causes the pickup unit 26 to orient the wafer to the correct position. As the main drive shaft 67 rotates the remaining 90° to bring the cycle to its conclusion, the cam 66 causes the pickup units 25 and 26 to descend, dwell, and rise again to the up position, the vacuums to the respective units 25 and 26 being de-actuated during the dwell. Accordingly, the wafer carried by the stationary pickup unit 25 is deposited in a table nest 73 at station A and the oriented wafer carried by the rotary pickup unit 26 is deposited in the unloading tray 31.

The rotary pickup unit 26 (FIG. 8) includes a housing 86 mounted on the plate 27 and serving as a support for a bevel gear 87 and its supporting hub 88. A flexible shaft 89 is connected at one end to gear 87 for imparting rotary movement thereto and at the other end to the output of the orienting unit 90. A cooperating bevel gear 91 and its supporting hub 92 are supported by and connected to a substantially square flanged portion 93 (FIG. 9) of a conventional vacuum pickup member 94. Vacuum pickup member 94 is supported by and rotatable within a housing 96 connected to the plate 27 and having vacuum inlet means 97 therein. The square portion 93 rotates within a pair of spring biased elongated members 98—98 (FIG. 9) pivotally supported at their respective ends in housing 86. The function of members 98—98 is to exert constant pressure against the portion 93 as it rotates to assure that the vacuum pickup member 94 rotates in accurate multiples of 90°. Stationary vacuum pickup unit 25 which is also mounted on the plate 27 includes a conventional vacuum pickup member 99 supported in a housing 101 having a vacuum inlet means 102 associated therewith.

*Orienting unit 90*

Orienting or rotary positioning of the wafer during the back to forward transfer interval is controlled in accordance with certain features of the invention by the orienting unit 90. As seen in FIGS. 8 and 14, the orienting unit 90 includes a conventional index clutch 103 having an extending member 104 protruding from the periphery thereof. Disposed at 90° intervals around the periphery of the clutch are four solenoids 143, 144, 145 and 146. Energization of a particular solenoid retracts its movable member and permits passage therebeneath of the extending clutch member 104; conversely, de-energization of a solenoid will cause its movable member to engage the clutch member 104 thereby preventing further rotation of the clutch 103. Rotary motion is imparted to the clutch 103 by any suitable mechanism, such as a motor 106. A rotary switch designated generally by the numeral 107 is connected to and rotates with the clutch 103 by means of a shaft 108.

As shown in FIGS. 11–13, the rotary switch 107 includes a substantially circular disc 109 composed advantageously of a dielectric material and having three substantially concentric rings 111, 112 and 113 of a conductive material on one side thereof. Signals calling for 90°, 180° or 270° of rotation are transmitted to rings 111, 112 and 113 from a relay control circuit by three brushes 111', 112' and 113' engaged therewith. On the reverse side of the switch 107, three contacts 118, 119 and 121 are provided at 90° intervals to the rings 111, 112 and 113 respectively. Connections from the switch 107 to the solenoids 143, 144, 145 and 146 (FIG. 14) are made by four brushes 143', 144', 145' and 146' spaced at 90° intervals around the disc 109 and engageable sequentially with the contacts 118, 119 and 121.

The function of the switch 107 is to carry the orientation reference of the set-up switch 330 around with the index clutch 103, as that member rotates. That is, the stopping point of the clutch 103 after orientation of a wafer becomes the 0° reference for positioning of the next succeeding wafer. Thus, for example, for 90° rotation, the 90° ring 111 and its associated contact 118 would be energized. This in turn would energize the solenoid whose movable member is in engagement with the clutch projecting member 104 and allow the clutch 103 to rotate until its projection 104 contacts the next de-energized solenoid member, which in this instance would be the next succeeding solenoid; accordingly, the clutch would only rotate 90°. Since the switch 107 rotates with the clutch 103 this places the 90° contact 118 under the brush leading to the de-energized solenoid which effected a stopping of the clutch. It should be apparent that the 90° contact 118 after orientation of a wafer will always be under the brush leading to the solenoid whose movable member causes the motion of the clutch 103 to be arrested. It should also be apparent that the 180° and 270° contacts will always be under the brushes leading to the next two succeeding solenoids. Accordingly, for 180° rotation the rings 111 and 112 would be energized and for 270° of rotation all three rings would be energized. Obviously for 0° rotation none of the rings would be energized. The above-described feature of the invention will be hereinafter referred to as a "floating orientation reference."

*Operation*

Referring now to the schematic diagram illustrated in FIG. 14, the operation of the apparatus will now be discussed in detail. In order to facilitate the description, the following assumptions will be made:

(1) An acceptable wafer is located on the table at station B which requires 90° of rotation in order to orient it to the 0° position, and
(2) The orientation motor 106 and the mechanism for imparting rotary motion to main drive shaft 67 are energized.

In order to facilitate association of relays and relay contacts, relay contacts operated by a relay are designated by the relay reference numeral followed by an identifying subscript letter. For example, the contacts controlled by relay 123 are designated 123a and 123b. Microswitch contacts are readily distinguishable from relay contacts since each of their switch contacts is designated by a whole number only.

In operation, after inspection of the wafer at station B by an operator, the set-up switch 330 would be momentarily thrown to its 90° position X to provide a path for energizing current to a set-up relay 123 that may be traced from a conductor 128 through the switch position X and the relay 123 to a conductor 129. Conductors 128 and 129 derive their energizing potential from an A.C. source 131 connected thereacross. The energization of the relay 123 results in the closure of contacts 123a and 123b. Upon closure of the contact 123a, an energizing path is provided to a time delay relay 132 and to the solenoid 72 through the normally closed contact 132a of the time delay relay 132.

As was explained in more detail hereinabove, energization of the solenoid 72 releases the cam 69 and allows the main drive shaft 67 to commence rotation and to initiate the transfer and orienting cycle. Shortly thereafter, the relay 132 energizes, opening the contact 132a and thereby de-energizing the solenoid 72 to enable its movable member 71 to engage the cam 69 after the main drive shaft 67 completes one revolution. Closure of the contact 123b provides a path for energizing current to a memory relay 133 that may be traced from the conductor 128 through the normally closed contact 134b of an isolating relay 134, the contacts 123b, the relay 133 and a normally closed microswitch contact 137 to the conductor 129.

The function of the memory relay 133 is to store the orientation information for transmittal to the rotary switch 107 during the orienting portion of the cycle. As will be explained in greater detail below, two other memory relays 135 and 136 are provided to perform like functions for 180° and 270° rotation respectively. Energization of the memory relay 133 closes its normally open contacts 133a and 133b. Closure of the contacts 133b completes a locking path for the relay 133 that may be traced from the conductor 128 through the contact 133b, the relay 133 and a microswitch contact 137 to the conductor 129. Closure of the contact 133a provides a path for energizing current to the isolating relay 134 that may be traced from the conductor 128 through the contact 133a, the relay 134 and the microswitch contact 137 to the conductor 129. Upon energization of the isolation relay 134, the contact 134a is closed to effect a locking circuit for the relay 134 and the contacts 134b, 134c and 134d are opened to isolate the memory relays 133, 135 and 136 after energization of a particular one, in the present instance, memory relay 133, to prevent accidental, incorrect energization of a memory relay once a position is chosen on the set-up switch 330. As has been set out hereinabove, after release of the main drive shaft 67, the table 28 indexes to bring the wafer at station B to station C, the carriage 43 moves to its back position, and the pickup units 25 and 26 move downward to place the pickup unit 25 on a wafer in the tray 29 and the pickup unit 26 on the wafer at station C. A microswitch contact 130 is then closed by the cam programmer 83 to actuate the respective vacuum control mechanisms 138 and 139 for the pickup units 25 and 26 thereby causing adherence of their respective wafers thereto. As the main drive shaft 67 continues to rotate, the pickup units 25 and 26 move to their up position and the carriage 43 starts to move to its forward position. During this latter interval, the programmer 83 actuates a microswitch contact 141 to energize a relay 142 and effects a closure of its normally open contacts 142a, 142b and 142c. Closure of the contact 142a provides a path for energizing current to the solenoid 143 and a relay 147 in parallel therewith that may be traced from the conductor 128 through the contact 133b, the contact 142a, the brush 111′, the ring 111, the ring contact 118, the brush 143′, the parallel combination of the solenoid 143 and the relay 147 and the microswitch contact 137 to the conductor 129. Upon energization of the relay 147 a holding circuit therefor and thus for the solenoid 143 as well, is established by the closure of a normally open contact 147a. Energization of the solenoid 143 as was previously pointed out, releases the index clutch 103 and allows rotation thereof. The clutch 103 rotates 90° until its extended member 104 engages the next succeeding de-energized solenoid, in the present instance, the solenoid 144. This rotation is transmitted by means of the flexible shaft 89 to the gear 87 to rotate the vacuum pickup member 94 and the wafer carried thereby, the same amount. To complete the cycle, the carriage 43 moves to the forward position and the pickup units 25 and 26 move downward to place the wafer carried by the pickup unit 25 on the table at station A and the oriented wafer carried by the pickup unit 26 in the unloading tray 131, the microswitch contact 130 being opened in the down position to deactivate the vacuums 138 and 139. The microswitch contacts 137 and 141 are then opened to de-energize the relay control circuitry and put the apparatus in readiness for subsequent operation.

Operation of the apparatus for 180° and 270° of rotation is substantially similar to that for 90° as described above. For 180° rotation, the set-up switch 330 would be momentarily thrown to its 180° position Y to energize the set-up relay 151 and effect a closure of its normally open contacts 151a, 151b and 151c. Closure of the contacts 151a would initiate the cycle in a like manner to that described above for the closure of the contact 123a, while closure of the contacts 151b and 151c would energize the memory relays 133 and 135 to store the orientation information until the microswitch contact 141 is closed to initiate the orienting operation by energizing the relay 142. Accordingly, upon the closure of contacts 142a and 142b energizing current is provided to the solenoids 143 and 144 to retract their respective movable members and allow the index clutch 103 to rotate 180°.

Where 270° of rotation is required, the set-up switch 330 would be momentarily thrown to its 270° position Z to energize the set-up relay 152. Energization of the set-up relay 152 results in the closure of its normally open contacts 152a, 152b, 152c and 152d. Closure of the contact 152a initiates the cycle, and closure of the contacts 152b, 152c and 152d results in the energization of all three memory relays. Accordingly, upon closure of the contacts 142a, 142b and 142c energizing current would be supplied to the solenoids 153, 144 and 145 to enable the index clutch 103 to rotate 270°.

For operation where no rotation is necessary, i.e., where the wafer is in the proper position at station B, the set-up switch 330 is thrown to its 0° position W to energize the set-up relay 153. Energization of the relay 153 closes the contact 153a to release the main shaft 67 and initiate a cycle. Since no orientation is necessary, none of the memory relays are energized and the apparatus goes through the cycle as set out above without any orientation.

If the wafer at station B is defective, the reject switch 340 will be operated to energize the reject relay 154. Energization of the relay 154 closes the contacts 154a and 154b and opens the contact 154c. Closure of the contact 154a completes a locking circuit to the relay 154 through the contact 154a and a normally closed microswitch contact 156, while closure of the contact 154b, as can readily be seen, initiates a cycle. The apparatus then proceeds through its cycle as above for 0° rotation except that the opening of the contact 154c disables the vacuum 139 to the rotary pickup unit 26. Thus, a wafer from the tray 29 will be deposited on the table 28 at station A but the wafer at station C will not be picked up. Instead upon the next indexing of the table 28, i.e., during the next succeeding cycle, this wafer will proceed to station D where it will be ejected into a reject receptacle (not shown). After completion of this cycle, the microswitch contact 156 is opened to de-energize the relay 154 and put the apparatus in readiness for subsequent operation.

*Alternative embodiment of orienting unit*

Another embodiment of the orienting unit is illustrated in FIG. 15. As shown therein, the mechanical transmittal of orienting information from the orientation unit 90 to the rotary pickup unit 26 by means of the flexible shaft 89 has been replaced by an electrical transmission via a conventional synchro transmitter 160 connected on a shaft 161 for rotation therewith and a conventional synchro receiver 162 mounted on the plate 27 for mechanical coupling with the gear 87. Further modifications involve the use of a conventional clutch 163 adapted for multiple 90° indexing and a modified rotary switch 164. The multiple 90° indexing of the clutch is accomplished by a conventional arrangement which includes a solenoid 166 mounted in a spaced relationship to the face plate of the clutch 163. The solenoid 166 is functional upon the energization thereof to have its movable member 165 disengage one of four apertures located in the clutch face plate at 90° intervals and allow rotation of the clutch. Upon de-energization of the solenoid 166, the member 165 engages the clutch face plate and enters the next succeeding aperture to arrest the motion of the clutch 163 and of the shaft 161 which is connected thereto for rotation therewith. Rotary movement is imparted to the clutch 163 by any suitable mechanism, such as the motor 167.

As is best illustrated in FIGS. 16–19, the modified rotary switch 164, which is mounted on the shaft 161, includes a substantially circular disc 168, advantageously composed of a dielectric material and having four substantially concentric rings 169, 170, 171 and 172 of a conductive material on one side thereof. Signals from a relay control circuit are applied to the four rings 169, 170, 171 and 172 by means of four brushes 169′, 170′, 171′ and 172′ engaged therewith. For 90° of rotation a signal is applied to the ring 170; for 180° rotation a signal is applied to the ring 171; for 270° rotation a signal is applied to the ring 172. The ring 169 always has a signal applied thereto. On the reverse side of the disc 168 three rectangularly shaped contacts 173, 174 and 175, spaced at 90° intervals, are provided for the three inner rings 170, 171 and 172, respectively. Contact to the outer ring 169 is made by a ring 176 on the reverse side that circumscribes an angle greater than 270° but less than 360°. Connections from the contacts 173, 174, 175 and 176 to the control circuit are made by four pairs of brushes disposed around the disc at 90° intervals. Brushes 177', 178', 179' and 180' are connected to four memory relays 177, 178, 179 and 180 (FIG. 20) respectively and are engageable sequentially with the rectangularly shaped contacts 173, 174 and 175, while brushes 181, 182, 183 and 184 are connectable to the memory relays 177, 178, 179 and 180, respectively via their respective normally open contacts 177a, 178a, 179a, and 180a, and are engageable with the partial ring 176.

*Operation of alternative embodiment*

Referring now to the schematic diagram illustrated in FIG. 20, the operation of the modified orientation unit will now be discussed in detail, the same assumptions made for the illustration of FIG. 14 being applicable here. Additionally, a relay or switch in this embodiment having a structure and function similar to that of a relay or switch in the schematic of FIG. 14 will be designated by a four digit reference numeral, the first three digits corresponding to the reference numeral of the corresponding component in the schematic of FIG. 14 and the last being zero.

Accordingly, after inspection of the wafer at station B, the set-up switch 3300 would be momentarily thrown to its 90° position X' to provide a path for energizing current to a set-up relay 1230 that may be traced from a conductor 1280 through the position X' and the relay 1230 to a conductor 1290. Conductors 1280 and 1290 derive their energizing potential from an A.C. source 1310 connected thereacross. Energization of the relay 1230 effects a closure of its normally open contacts 1230a and 1230b. Closure of the contact 1230a provides a path for energizing current to the solenoid 72 that may be traced from the conductor 1280 through the contact 1230a, a normally closed contact 186a of an isolation relay 186 and the solenoid 72 to the conductor 1290. This results in the release of the cam 69 and initiates the transfer and orienting cycle. Closure of the contact 1230b energizes one of the four memory relays via the rotary switch 164.

As an illustration, let it be assumed that the contact 173 to the 90° ring 170 is under the brush 177' leading to the memory relay 177. Accordingly, a path for energizing current is provided to the relay 177 that may be traced from the conductor 1280 through a normally closed contact 186c of the isolation relay 186, the contact 1230b, the brush 170', the 90° ring 170, the 90° contact 173, the brush 177', and the relay 177 to the conductor 1290. Energization of the memory relay 177 closes its normally open contacts 177a and 177b. Closure of the contact 177a completes a locking circuit for the relay 197 that may be traced from the conductor 1280 through the brush 169', the ring 169, the partial ring 176, the brush 181, the contact 177a and the relay 177 to the conductor 1290.

Shortly after the main drive shaft 67 commences rotation, the cam programmer 83 closes a microswitch contact 187 to energize the isolation relay 186. The function of the isolation relay 186, as in the illustration of FIG. 14, is to isolate the memory relays 177, 178, 179 and 180 after energization of a particular one, in the present instance, memory relay 177, to prevent accidental incorrect energization of another memory relay once a position is chosen on the set-up switch 3300. Accordingly, energization of the isolation relay 186 opens contact 186c to effect the isolation and closes a contact 186b to complete a locking circuit for the relay 186. Additionally, the contact 186a is opened to de-energize the solenoid 72 to enable its movable member 71 to engage the cam 69 after one revolution of the main drive shaft 67.

The apparatus then continues through its cycle, as described above for the illustration of FIG. 14, with a microswitch contact 1300 being closed to turn on the vacuum to the pickup units 25 and 26 and a microswitch contact 188 being closed to initiate the orienting cycle during the back-to-forward transfer interval.

It will be recalled from the preceding that the energization of the memory relay 177 effected a closure of the contact 177b; accordingly, upon closure of the contact 188 a path for energizing current to the solenoid 166 is provided that may be traced from the conductor 1280 through the contact 177b, the microswitch contact 188 and the solenoid 166 to the conductor 1290. Energization of the solenoid 166, retracts its movable member 165 and allows the clutch 163 to rotate, the switch 164 and the synchro transmitter 160 rotating therewith. As the switch 164 rotates in the clockwise direction shown by the arrow (FIG. 18), the 90° contact 173 and the partial ring 176 rotate past the brushes 177' and 181.

As the end of the partial ring 176 passes under the brush 181, the locking circuit for the memory relay 177 is opened. This results in the opening of the contact 177b, which in turn, results in the de-energization of the solenoid 166 thereby enabling its movable member 165 to drop into the next succeeding aperture and arrest the motion of the clutch 163. Accordingly, since the apertures are spaced at 90° intervals, the clutch 163 rotates 90°. Since the synchro transmitter 160 also rotates 90°, this rotation is then transmitted electrically over wires 185, 186 and 187 to the synchro receiver 162. The synchro receiver 162 then rotates the vacuum pickup member 94, 90° to accomplish the orientation. The synchro transmitter 160 and receiver 162 receive their reference power from a conventional single-phase A.C. power source 189. As above for the illustration of FIG. 14, the microswitch contact 1300 is opened to release the respective wafers carried by the pickup units 25 and 26. At the conclusion of the cycle, the microswitch contact 187 is opened to de-energize the isolation relay 186 and place the apparatus in readiness for subsequent operation.

It will be recalled, that it was assumed that the 90° contact 173 was under the brush leading to the relay 177. It should now be apparent that the 90° contact 173 could have been under a brush leading to any of the other three memory relays 178, 179 or 180, since the locking circuit to the relay selected would always be opened before 90° of rotation had ensued.

A 180° rotation may be obtained in a manner similar to that just described for 90° of rotation except that, in this instance, the relay selected would be held in by the partial ring 176 for an interval greater than 90° but less than 180°. Accordingly, for 180° of rotation, the set-up switch 3300 would be momentarily thrown to its 180° position Y' to energize a set-up relay 1510, thereby effecting a closure of its contacts 1510a and 1510b. Closure of the contact 1510a energizes the solenoid 72 to initiate a cycle, while closure of the contact 1510b, if it is assumed that the 90° contact 173 is under the brush 177' leading to the relay 177, energizes the memory relay 178, the path being traced from the conductor 1280 through the contact 186c, the contact 1510b, the brush 171', the 180° ring 171, the 180° contact 174, the brush 170' and the relay 178 to the conductor 1290. Energization of the relay 178 closes its normally open contacts 178a and 178b. Accordingly, relay 178 locks in by virtue of power being supplied thereto from the partial ring 176 via the brush 182 and the contact 178a.

Upon closure of the microswitch contact 188, a path for energizing current is provided to the solenoid 166 that may be traced from the conductor 1280, through the contact 178b, the microswitch contact 188 and the solenoid 166 to the conductor 1290. This retracts the movable member 165 and allows the clutch 163 to rotate, the clutch 163 rotating until the movable member 165 re-engages an aperture of the clutch face plate. Accordingly, since the partial ring 176 has continuity of greater than 90°, but less than 180°, from the 180° contact 174 in a direction opposite to the direction of rotation, the relay 178 will drop out after 90° of rotation but before 180° to enable the movable member 165 to engage the clutch face plate upon the expiration of 180° of rotation.

Operation for 270° of rotation is similar to that described above for 90° and 180°; however, in this case the memory relay selected e.g., the relay 179, would be held in for an interval of greater than 180° but less than 270°.

Operation of the circuit in the instances where 0° of rotation is required or where the wafer under inspection is a reject is similar to that as described above for the illustration of FIG. 14.

It is to be understood that the above-described arrangements are simply illustrative of the application of the principles of the invention. Numerous other arrangements may be readily devised by those skilled in the art which will embody the principle of the invention and fall within the spirit and scope thereof.

What is claimed is:
1. In a rotary positioning apparatus,
a first rotatable member having an extending member,
means for urging said rotatable member to rotate,
means selectively operable for engaging said extending member to prevent rotation of said first rotatable member and for disengaging said extending member to allow rotation of said first rotatable member, said means including a plurality of electromechanical devices spaced equiangularly with respect to the axis of rotation of said first rotatable member, and normally positioned to engage said extending member,
a second member rotated by said first rotatable member having a plurality of contact means thereon which number one less than the number of said electromechanical devices and arranged angularly on said second rotatable member to correspond to the angular arrangements of said electromechanical devices, leaving one electromechanical device without a contact means,
brush means to selectively connect a combination of said contact means to said electromechanical devices such that each combination of contact means corresponds to a fixed angular displacement from said extending member, and
means for energizing a combination of one or more of said contact means to energize one or more of said electromechanical devices whereupon said urging means is rendered effective to rotate said rotatable member until it is engaged by a now unenergized electromechanical device.

2. In a rotary positioning apparatus,
a first rotatable member,
means for urging said rotatable member to rotate,
a plurality of stop means positioned around said rotatable member, selectively energizable to cooperate with said first rotatable member for precluding rotation of said rotatable member at increments which are multiples of a fixed angle,
a disk rotated by said first rotatable member having concentric conducting rings which number one less than the number of said stop means,
a plurality of electrodes equal to the number of said rings arranged angularly on said disk to correspond to the angular arrangement of said stop means,
means for connecting each of said electrodes to one of said rings,
a plurality of brush means for selective contact with said electrodes equal to the number of said stop means and angularly arranged about said disk to correspond to the arrangement of said stop means,
means to connect each brush means to its corresponding stop means, and
means for selectively energizing a combination of one or more of said rings, to energize a combination of one or more of said stop means whereupon said urging means is rendered effective to rotate the rotatable member until engaged by a non-energized stop means.

3. Rotary positioning apparatus, which comprises:
a rotatable member;
a plurality of equally spaced, individually energizable electromechanical devices disposed about said rotatable member, each electromechanical device when de-energized being engageable with the rotatable member to prevent rotation thereof and when energized being disengaged from the rotatable member to permit rotation thereof, the amount of rotation of the rotatable member depending upon the number of devices which are energized;
a disc of dielectric material rotatable with the rotatable member, one side of the disc having a plurality of concentric rings of conductive material, the number of rings being one less than the number of electromechanical devices, the other side of the disc having a plurality of radially spaced, conductive electrodes, one electrode being provided for each of the rings and each of the electrodes being in ohmic contact with its respective ring;
a plurality of brushes, one for each of the electromechanical devices, the brushes being equally spaced about the other side of the disc and being sequentially engageable with the radially spaced, conductive electrodes; and
means for energizing one or more of the concentric rings in accordance with a desired rotation of the rotatable member to energize one or more of the electromechanical devices and thereby permit the rotatable member to rotate the desired amount.

4. Apparatus in accordance with claim 3, wherein the rotatable member includes an annular member having an extending element which when engaged by one of the electromechanical devices arrests the motion of the rotatable member.

5. Rotary positioning apparatus, which comprises:
a rotatable member;
an electromechanical device, which when de-energized is engageable with the member to prevent rotation thereof and when energized is disengageable from the member to permit rotation thereof;
a disc of dielectric material rotatable with the rotatable member, one side of the disc having a plurality of concentric rings of conductive material, the other side of the disc having a discontinuous ring electrode of conductive material in ohmic contact with one of the concentric rings and a plurality of radially spaced, conductive electrodes, each of the radially spaced, conductive electrodes being in ohmic contact with a different one of the concentric rings;
a plurality of equally spaced pairs of brushes disposed about the other side of the disc, a first brush of each pair being engageable with the discontinuous ring electrode and a second brush of each pair being sequentially engageable with the radially spaced, conductive electrodes;
a plurality of relays, one for each pair of brushes;
means for connecting each brush to the coil of its corresponding relay with each first brush being connected to the coil of its corresponding relay through a normally open contact thereof;
means including a normally open contact of each relay for energizing the electromechanical device; and
means for energizing the concentric ring corresponding to the discontinuous ring electrode and for energizing one of the other concentric rings in accordance with a desired rotation of the rotatable member to energize one of the relays and thereby energize the electromechanical device to permit rotation of the member, the relay and the electromechanical device remaining energized as long as the first brush of the pair of brushes associated with the selected relay is in engagement with the discontinuous ring electrode.

6. Apparatus according to claim 5, wherein:

the rotatable member includes an annular plate having a plurality of apertures equally spaced from each other and from the center of rotation of the plate; and the electromechanical device includes a shaft and is positioned with respect to the plate such that when the device is de-energized the shaft extends therefrom and enters into one of the plate apertures to prevent rotation of the plate and when the device is energized the shaft retracts and is withdrawn from a plate aperture to permit rotation of the plate.

References Cited by the Examiner

UNITED STATES PATENTS

| | | | |
|---|---|---|---|
| 1,830,756 | 11/1931 | Ford | 235—98 X |
| 2,209,858 | 7/1940 | Steiert | 74—112 |
| 2,600,144 | 6/1952 | Watson. | |
| 2,627,415 | 2/1953 | Rasmussen | 307—141 X |
| 3,162,777 | 12/1964 | Weber et al. | 307—141 |
| 3,188,504 | 6/1965 | Anderson | 307—141 |

BERNARD A. GILHEANY, *Primary Examiner.*

J. J. BAKER, *Assistant Examiner.*